United States Patent [19]
Sakai et al.

[11] Patent Number: 5,463,995
[45] Date of Patent: Nov. 7, 1995

[54] INTAKE SYSTEM FOR INTERNAL COMBUSTION ENGINE

[75] Inventors: Hisao Sakai; Hiroo Shimada; Hiroshi Sono; Kenichi Nagahiro; Narutoshi Sugita; Hirotsugu Maeda; Masakatsu Miyao; Katsunori Nakamura; Yasunori Ogita; Osamu Suzuki, all of Saitama, Japan

[73] Assignee: Honda Giken Kogyo Kabushiki Kaisha, Tokyo, Japan

[21] Appl. No.: 181,744

[22] Filed: Jan. 24, 1994

[30] Foreign Application Priority Data

Jan. 22, 1993 [JP] Japan ..................... 5-008937
Jun. 14, 1993 [JP] Japan ..................... 5-141684

[51] Int. Cl.⁶ ................................................. F02B 15/00
[52] U.S. Cl. .............................................. 123/432; 123/308
[58] Field of Search ............................... 123/432, 308, 123/90.16

[56] References Cited

U.S. PATENT DOCUMENTS

| | | | |
|---|---|---|---|
| 4,497,288 | 2/1985 | Nakano et al. ............. | 123/52 |
| 4,553,507 | 11/1985 | Shaffer ...................... | 123/432 |
| 4,726,340 | 2/1988 | Hasegawa et al. .......... | 123/432 |
| 4,955,347 | 9/1990 | Toyoda ...................... | 123/432 |
| 5,081,971 | 1/1992 | Inoue et al. ................ | 123/432 |
| 5,167,211 | 12/1992 | Fukuma et al. ............. | 123/308 |

FOREIGN PATENT DOCUMENTS

| | | | |
|---|---|---|---|
| 0470869 | 1/1992 | European Pat. Off. ........ | 1/26 |
| 59-33852 | 9/1984 | Japan . | |
| 0093121 | 5/1985 | Japan ...................... | 123/308 |
| 494407 | 3/1992 | Japan . | |

OTHER PUBLICATIONS

Communication from European Patent Office.
English Language Abstract of Japanese Publications 62-58019, 61-286528, 61-28714.

Primary Examiner—Henry C. Yuen
Assistant Examiner—Erick Solis
Attorney, Agent, or Firm—Lyon & Lyon

[57] ABSTRACT

An intake system for an internal combustion engine includes first and second intake valve bores provided to face a combustion chamber and to be independently opened and closed by first and second intake valves, and first and second intake ports which are connected to the corresponding intake valve bores with a partition wall interposed therebetween and which communicate with a common intake passage. In a particular operation range of the engine, an imbalance is produced in the concentration of the air-fuel mixture flowing through the first and second intake valve bores into the combustion chamber on the basis of a difference between the amounts of fresh air flowing into the first and second intake ports. The intake system further includes a communication hole provided in the partition wall for putting the first and second intake ports into communication with each other. This provides for improvements in the lean combustibility and in the nature of the exhaust gas.

31 Claims, 9 Drawing Sheets

INTAKE SYSTEM FOR INTERNAL COMBUSTION ENGINE

BACKGROUND OF THE INVENTION

1. Field of the Invention

The present invention relates to an intake system for an internal combustion engine, comprising first and second intake valve bores provided to face a combustion chamber and to be independently opened and closed by first and second intake valves, and first and second intake ports which are respectively connected to the first and second intake valve bores with a partition wall interposed therebetween and which communicate with a common intake passage, in which, in a particular operating range of the engine, an imbalance is produced in the concentration of the air-fuel mixture flowing through the first and second intake valve bores into the combustion chamber on the basis of a difference between the amounts of fresh air flowing into the first and second intake ports.

2. Description of the Prior Art

Such systems are conventionally known, for example, from Japanese Patent Application Laid-open No. 94407/92.

In the system disclosed in the above-described patent application, one of the pair of intake valves is opened and closed in a smaller amount and for a smaller time period than those of the other intake valve in a particular operating range of the engine, thereby producing a swirl required for lean burning. In such case, a difference is produced between the amounts of fresh air flowing into the intake ports, on the one hand, and in order to ensure that the fuel is substantially equally injected from a fuel injection valve into both the intake ports, an imbalance is produced in concentration of the air-fuel mixture flowing through the intake valve bores into the combustion chamber, on the other hand. More specifically, the concentration of the fuel in the air-fuel mixture flowing into the combustion chamber through the one intake valve bore opened in the smaller lift amount and for the smaller time period is higher than that of the fuel in the air-fuel mixture flowing into the combustion chamber through the other intake valve bore. Since the air-fuel mixture having the higher fuel concentration flows into the combustion chamber in the middle of an intake stroke, the concentration of the fuel in the vicinity of the spark plug is higher, thereby providing an improved ignitability for the lean burning, but resulting in a deteriorated nature of the exhaust gas and, in particular, resulting in NOx being liable to be produced.

On the other hand, there is a conventionally known intake system in which, as disclosed in Japanese Utility Model Publication No. 33852/84, in a particular operating range of the engine, only one of the pair of intake valves is opened and closed, while the other intake valve is brought into a completely inoperative state, thereby producing a swirl flow in the combustion chamber to cause a lean burning, without a problem of an imbalance in the concentration of the air-fuel mixture flowing through the intake ports into the combustion chamber. In this system, in order to prevent fuel droplets and the air-fuel mixture from being stagnated within the intake port which is in the inoperative state, the intake ports of the pair are connected to each other through a communication hole. However, if the construction is such that the air-fuel mixture is supplied only through the one intake port into the combustion chamber, an intensive swirl is produced within the combustion chamber and hence, a fuel concentration profile within the combustion chamber is such that the fuel concentration is gradually higher toward the radially outer portion of the combustion chamber. As a result, a reduction in ignitability during the lean burning or the like is brought about due to a relatively low fuel concentration around the spark plug located at substantially the center of the combustion chamber ceiling.

SUMMARY OF THE INVENTION

Accordingly, it is an object of the present invention to provide an intake system for an internal combustion engine, wherein improvements in lean combustibility and in the nature of the exhaust gas and the like are provided.

To achieve the above object, according to the present invention, there is provided an intake system for an internal combustion engine, comprising first and second intake valve bores provided to face a combustion chamber and to be independently opened and closed by first and second intake valves, and first and second intake ports which are respectively connected to the first and second intake valve bores with a partition wall interposed therebetween and which communicate with a common intake passage, in which, in a particular operating range of the engine, an imbalance is produced in the concentration of the air-fuel mixture flowing through the first and second intake valve bores into the combustion chamber on the basis of a difference between the amounts of fresh air flowing into the first and second intake ports, wherein the system further includes a communication hole provided in the partition wall for putting the first and second intake ports into communication with each other.

With the above construction, in the particular operating range of the engine, a portion of the air-fuel mixture can be permitted to flow from the intake port where the concentration of the air-fuel mixture is higher into the intake port where the concentration of the air-fuel mixture is lower, thereby preventing the concentration of the air-fuel mixture in the vicinity of the spark plug from being extremely high and thereby providing a reduction in amount of NOx produced, while promoting the generation of a swirl within the combustion chamber to provide an improvement in lean combustibility, which contributes to a reduction in specific fuel consumption.

If the communication hole is formed such that the area of the opening into the intake port where the concentration of the air-fuel mixture is higher in the particular operating range of the engine is larger than the area of the opening into the intake port where the concentration of the air-fuel mixture is lower, the speed of the air-fuel mixture flowing through the communication hole can be increased by a throttling effect to further promote the generation of a swirl, thereby further improving the lean combustibility and increasing the degree of freedom of the arrangement, taking the direction of the communication hole and the like into consideration.

Further, if the bottom surface of the communication hole is smoothly connected to the bottom surface of the intake port where the concentration of the air-fuel mixture is higher in the particular operating range of the engine, the fuel deposited on the inner surface of the intake port where the concentration of the air-fuel mixture is higher can be reliably guided through the communication hole into the other intake port, thereby further promoting the equalization of the concentration of the air-fuel mixture.

Still, further, if the communication hole is inclined toward the combustion chamber as it approaches the intake port where the concentration of the air-fuel mixture is lower in the particular operating range of the engine from the intake port where the concentration of the air-fuel mixture is higher, the swirl flow of the air-fuel mixture flowing from the communication hole can be intensified to provide a further improved lean combustibility.

Still further, if the intake port where the concentration of the air-fuel mixture is lower in the particular operating range of the engine is formed into a shape suitable for producing a swirl within the combustion chamber in the particular operating range of the engine, the swirl flow can be further intensified in cooperation with the flow of the air-fuel mixture from the communication hole to further contribute to a reduction in specific fuel consumption by an improvement in lean combustibility.

Still further, if there is provided a switch-over means capable of switching-over between the following two states, from one to the other: 1) a state in which the amounts of fresh air flowing into the first and second intake ports are not equalized in a low-load operating range of the engine, and 2) a state in which the amounts of fresh air flowing into the first and second intake ports are equalized in a high-load operating range of the engine, it is possible to provide improvements in both the nature of the exhaust gas and in the specific fuel consumption in the low-load operating range of the engine and an increase in power output in the high-load operating range of the engine.

In addition, according to the present invention, there is provided an intake system for an internal combustion engine, comprising first and second intake valve bores provided to face a combustion chamber and to be independently opened and closed by first and second intake valves, first and second intake ports which are respectively connected to the first and second intake valve bores with a partition wall interposed therebetween and which communicate with a common intake passage, a fuel injection valve disposed in the vicinity of the junction of the first and second intake ports for injecting the fuel substantially equally toward both the intake ports, and a valve operating mechanism connected to the first and second intake valves for opening and closing the second intake valve with an operation characteristic where at least one of either the lift amount on the opening time period is maintained smaller than that of the first intake valve, at least in a particular operating range of the engine, the system further including a communication hole provided in the partition wall for putting the first and second intake ports into communication with each other.

With the above construction, in the operating range of the engine in which at least one of either the lift amount on the opening time period of the second intake valve is smaller than that of the first intake valve, a portion of the air-fuel mixture in the second intake port where the concentration of the air-fuel mixture is higher can be permitted to flow into the first intake port, thereby preventing the concentration of the air-fuel mixture in the vicinity of the spark plug from being extremely high and thereby providing a reduction in amount of NOx produced, while providing an improvement in lean combustibility to contribute to a reduction in specific fuel consumption.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 7 illustrate an internal combustion engine to which a first embodiment of the present invention is applied, wherein FIG. 1 is a longitudinal sectional view of an essential portion of the internal combustion engine;

FIG. 2 is a perspective view illustrating a cylinder block and a cylinder head;

FIG. 3 is a sectional view taken along a line 3—3 in FIG. 1;

FIG. 4 is a diagram illustrating a lift characteristic for intake and exhaust valves;

FIG. 5 is a simplified plan view of intake ports shown as being connected to a combustion chamber;

FIG. 6 is a longitudinal sectional view of the first intake port taken along a line 6—6 in FIG. 5; and FIG. 7 is a sectional view taken along a line 7—7 in FIG. 6;

FIGS. 8 and 9 illustrate an internal combustion engine to which a second embodiment of the present invention is applied, wherein FIG. 8 is a sectional view similar to FIG. 3;

FIG. 9 is a diagram illustrating a lift characteristic for intake and exhaust valves;

DESCRIPTION OF THE PREFERRED EMBODIMENTS

A first embodiment of the present invention will now be described in connection with the FIGS. 1 to 7.

Figure 1:
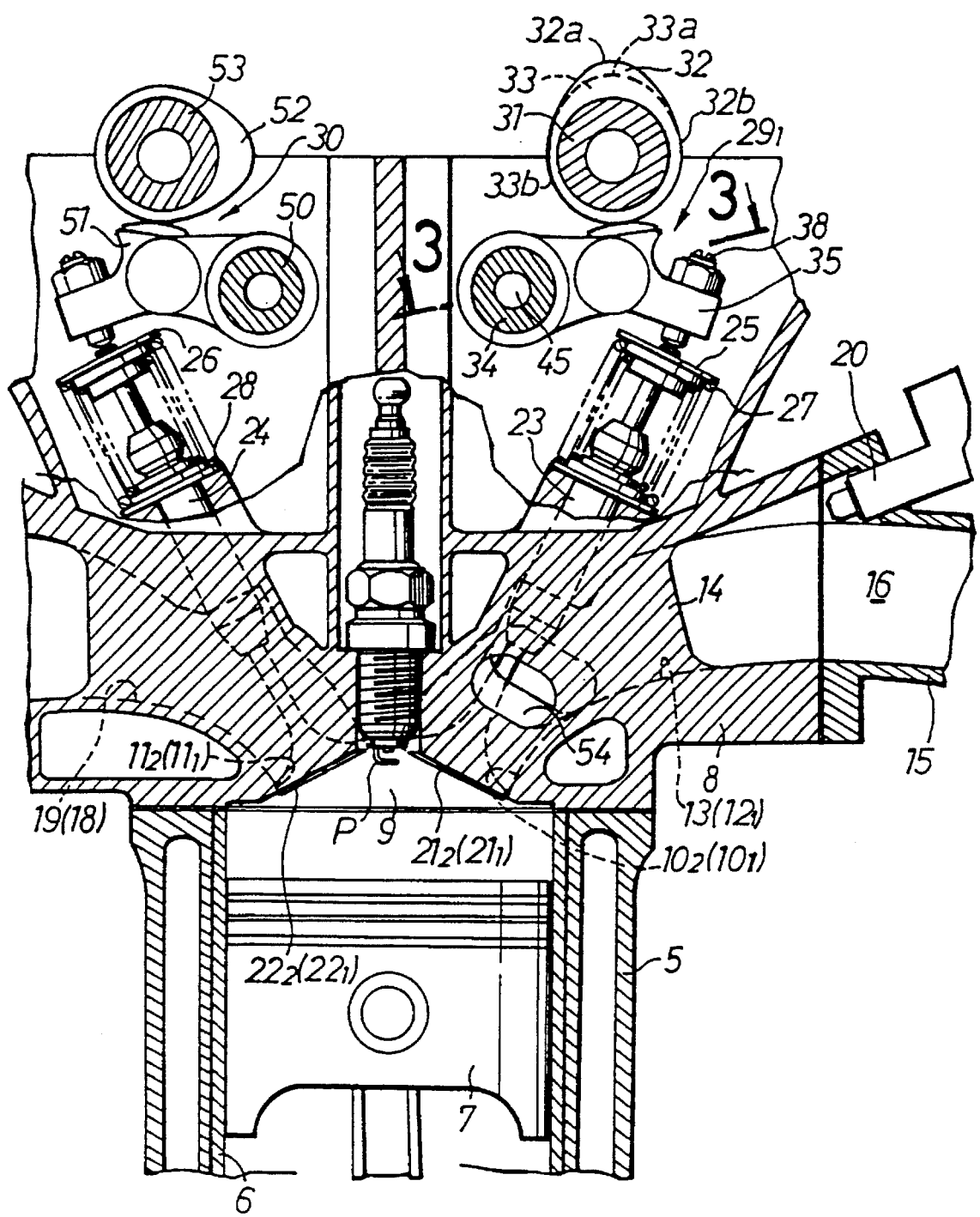
Figure 2:
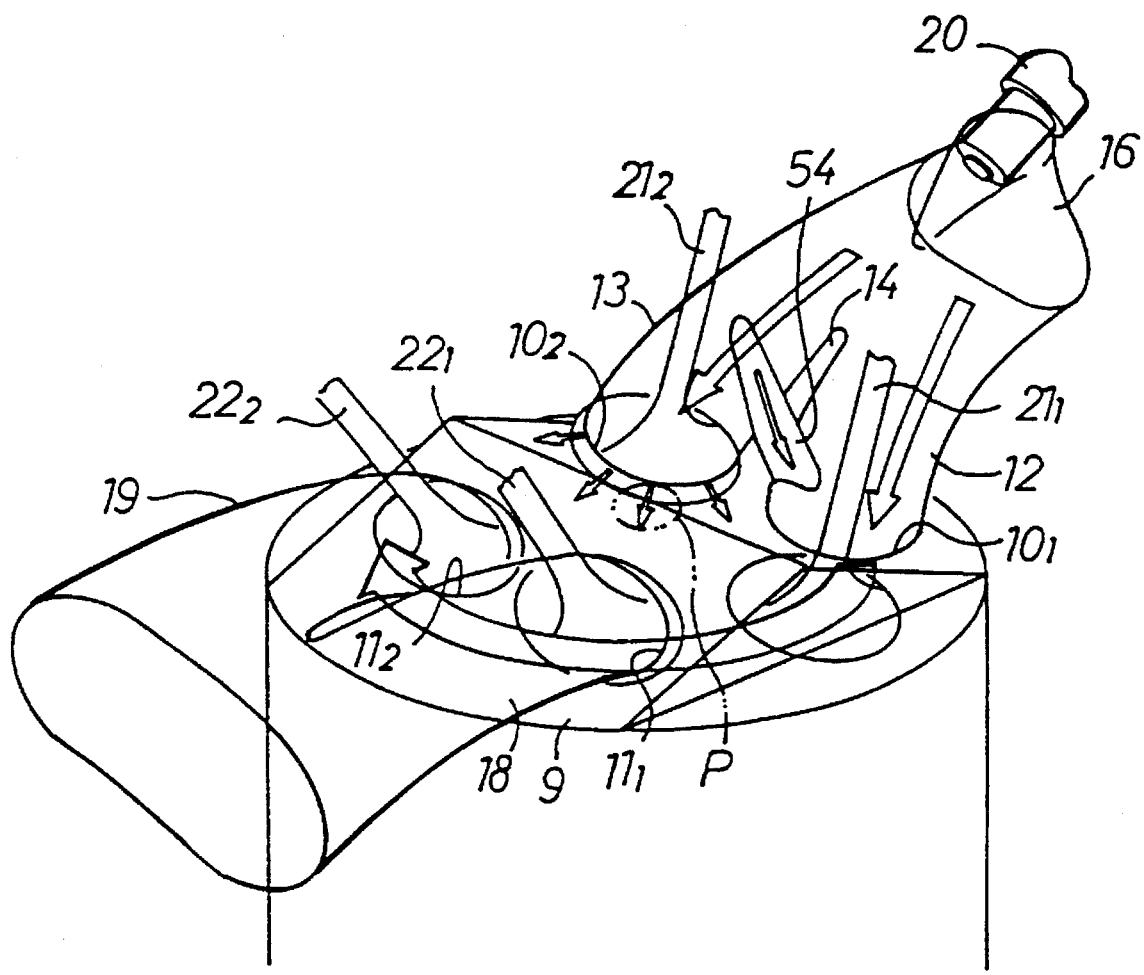

Referring first to FIGS. 1 and 2, a piston 7 is slidably received in a cylinder 6 mounted in a cylinder block 5. A combustion chamber 9 is defined between a cylinder head 8 coupled to an upper end of the cylinder block 5 and the piston 7. First and second intake valve bores $10_1$ and $10_2$ and first and second exhaust valve bores $11_1$ and $11_2$ are provided in the cylinder head 8 in the ceiling surface of the combustion chamber 9, and a spark plug P is mounted in the cylinder head 8 and located in a substantially central portion of the ceiling surface of the combustion chamber 9. The cylinder head 8 is provided with a first intake port $12_1$ leading to the first intake valve bore $10_1$ and with a second intake port 13 leading to the second intake valve bore $10_2$, with a partition wall 14 interposed between the first and second intake ports $12_1$ and 13. The intake ports $12_1$ and 13 communicate with an intake passage 16 defined in the cylinder head 8 and an intake manifold 15. The first and second exhaust valve bores $11_1$ and $11_2$ are connected to first and second exhaust ports 18 and 19 which are connected to an exhaust manifold that is not shown.

A fuel injection valve 20 is mounted in the intake manifold 15 in the vicinity of a junction of the intake ports $12_1$ and 13 for injecting a fuel substantially equally into the first and second intake ports $12_1$ and 13.

Two pairs of guide sleeves 23 and 24 are fixedly received in the cylinder head 8 to guide first and second intake valves $21_1$ and $21_2$ capable of opening and closing the first and second intake valve bores $10_1$ and $10_2$, and first and second exhaust valves $22_1$ and $22_2$ capable of opening and closing the first and second exhaust valve bores $11_1$ and $11_2$, respectively. Valve springs 27 and 28 are mounted under compression between the cylinder head 8 and retainers 25 and 26 mounted at upper ends of the intake valves $21_1$ and $21_2$ and the exhaust valves $22_1$ and $22_2$ which project upwardly from the guide sleeves 23 and 24, respectively, so that the intake valves $21_1$ and $21_2$ and the exhaust valves $22_1$ and $22_2$ are biased upwardly, i.e., in valve-closing directions by the valve springs 27 and 28, respectively.

An intake-side valve operating mechanism $29_1$ is connected to the intake valves $21_1$ and $21_2$, and an exhaust-side valve operating mechanism 30 is connected to the exhaust valves $22_1$ and $22_2$.

Figure 3:
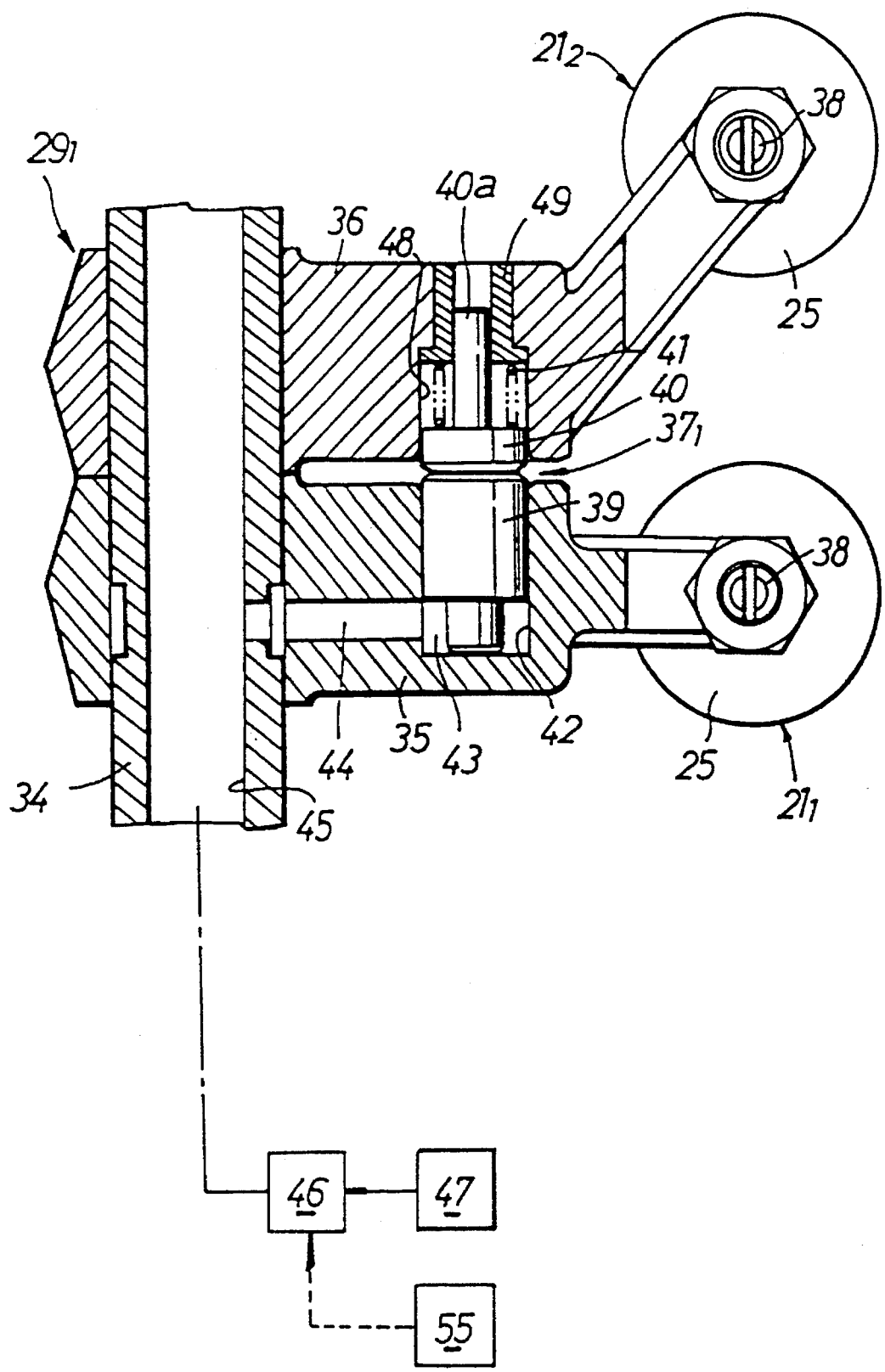

Referring also to FIG. 3, the intake-side valve operating mechanism $29_1$ comprises a cam shaft 31 rotatively driven at a reduction ratio of ½ from a crank shaft (not shown) of the engine, a first cam 32 and a second cam 33 provided on the cam shaft 31, a rocker shaft 34 fixedly disposed parallel to the cam shaft 31, a first rocker arm 35 operatively connected to the first intake valve $21_1$ and pivotally carried on the rocker shaft 34, a second rocker arm 36 operatively connected to the second intake valve $21_2$ and pivotally carried on the rocker shaft 34, and a switchover means $37_1$ provided between the first and second rocker arms 35 and 36.

The first cam 32 is positioned in a location corresponding to the first intake valve $21_1$, and the second cam 33 is positioned in a location corresponding to the second intake valve $21_2$. The first cam 32 comprises a base-circle portion 32b and a cam lobe 32a projecting radially outwardly from the base-circle portion 32b. The second cam 33 comprises a base-circle portion 33b and a cam lobe 33a slightly projecting radially outwardly from the base-circle portion 33b. The cam lobe 33a projects radially outwardly from the base-circle portion 33b at a smaller amount and with a smaller angular extent than the cam lobe 32a of the first cam 32.

The rocker shaft 34 is fixedly supported on the cylinder head 8 to have an axis parallel to the cam shaft 31. The first rocker arm 35 is operatively connected to the first intake valve $21_1$ and the rocker arm 36 is operatively connected to the second intake valve $21_2$. The first and second rocker arms 35 and 36 are pivotally carried adjacent each other on the rocker shaft 34.

Tappet screws 38 are axially movably threaded in the first and second rocker arms 35 and 36 and held in abutment against the upper ends of the intake valves $21_1$ and $21_2$, respectively. Therefore, the intake valves $21_1$ and $21_2$ are operated in response to the rocking movement of the rocker arms 35 and 36.

The switch-over means $37_1$ comprises a switch-over piston 39 capable of connecting the first and second rocker arms 35 and 36, a limiting member 40 adapted to abut against the switch-over piston 39, and a return spring 41 for biasing the limiting member 40 toward the switch-over piston 39.

The first rocker arm 35 has a bottomed guide hole 42 defined therein in parallel to the rocker shaft 34 and opened toward the second rocker arm 36. The switch-over piston 39 is slidably fitted in the guide hole 42, and a fluid pressure chamber 43 is defined between one end of the switch-over piston 39 and a closed end of the guide hole 42. The first rocker arm 35 has a passage 44 provided therein to communicate with the fluid pressure chamber 43, and the rocker shaft 34 has an oil feed passage 45 provided therein. The oil feed passage 45 is continually held in communication with the fluid pressure chamber 43 through the passage 44, irrespective of the swinging movement of the first rocker arm 35.

The oil feed passage 45 is connected to a fluid pressure source 47 through a control valve 46 which is capable of switching-over the fluid pressure from the fluid pressure source 47 between high and low levels to supply the selected oil pressure to the oil feed passage 45 and thus to the fluid pressure chamber 43.

The second rocker arm 36 has a guide hole 48 corresponding to the guide hole 42. The guide hole 48 extends parallel to the rocker shaft 34 and is opened toward the first rocker arm 35. The limiting member 40, which is in the form of a disk-like member and is held in abutment against the facing end of the switch-over piston 39, is slidably fitted in one end of the guide hole 48. A tubular guide member 49 is fixedly inserted through the other end of the guide hole 48. A rod 40a is coaxially and integrally provided on the limiting member 40 and movably inserted through the guide member 49. The return spring 41 is mounted under compression between the guide member 48 and the limiting member 40, so that the connecting piston 39 and the limiting member 40, abutting against each other, are biased toward the fluid pressure chamber 43 by the spring force of the return spring 41.

In such switch-over means $37_1$ an increase in fluid pressure in the fluid pressure chamber 43 causes the switch-over piston 39 to be fitted into the guide hole 48, thereby connecting the rocker arms 35 and 36. When the fluid pressure in the fluid pressure chamber 43 is reduced, the switch-over piston 39 is returned under the spring force of the return spring 41 to a position in which its abutment surface against the limiting member corresponds to the space between the rocker arms 35 and 36, thereby disconnecting the rocker arms 35 and 36 from each other.

Figure 4:
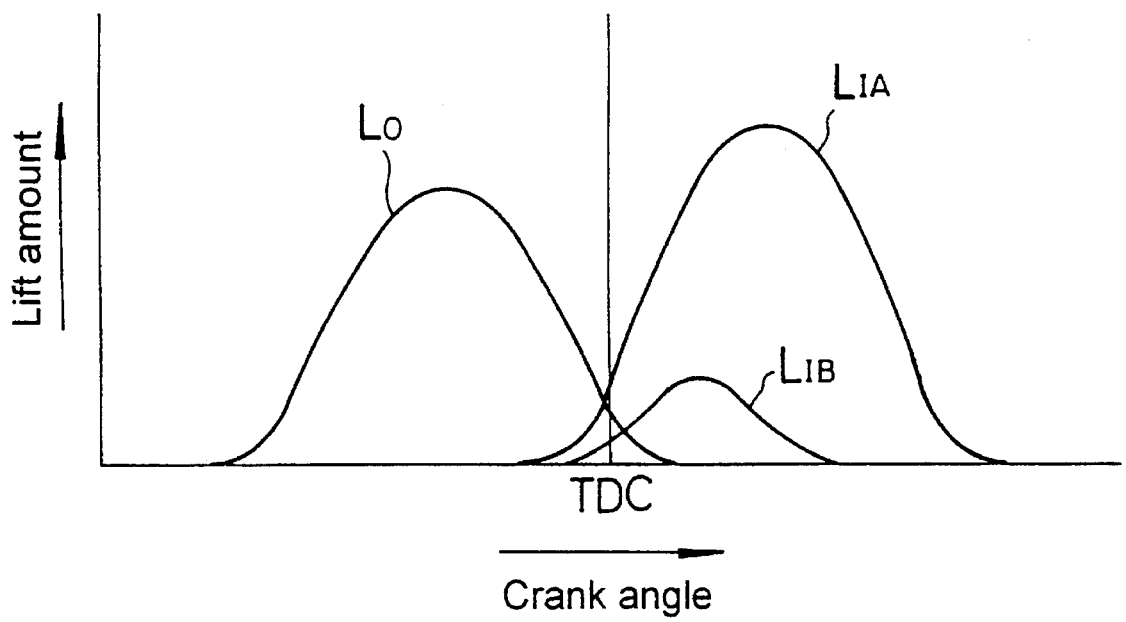
Figure 5:
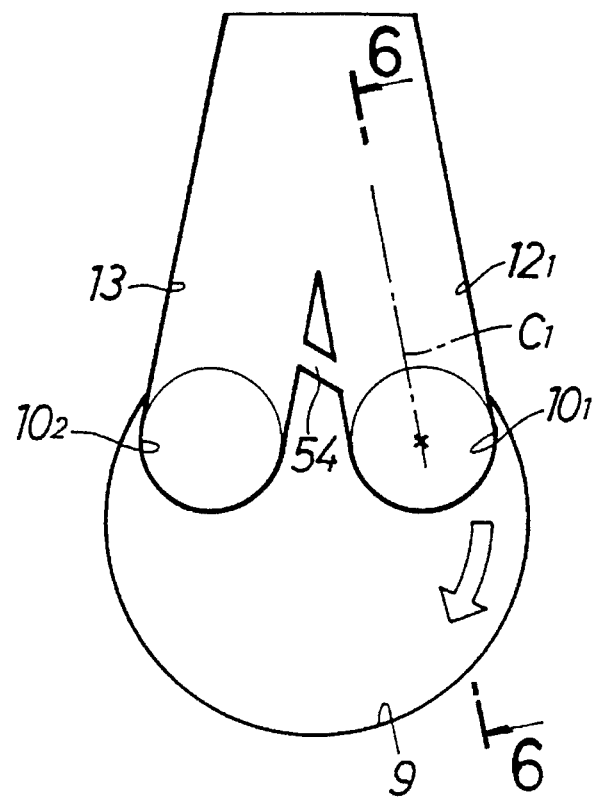

Therefore, in the intake-side valve operating mechanism $29_1$, when the switch-over means $37_1$ is brought into a disconnecting state, the first intake valve $21_1$ is opened and closed with a characteristic determined by the first cam 32, as shown by a curve $L_{IA}$ in FIG. 4, and the second intake valve $21_2$ is opened and closed with a characteristic determined by the second cam 33, i.e., as shown by a curve $L_{IB}$ in FIG. 4, so that it is opened with a lift amount smaller than that of the first intake valve $21_1$ in the first half of the intake stroke corresponding to the cam lobe 33a of the second cam 33. When the switch-over means $37_1$ is brought into a connecting state, the first and second intake valves $21_1$ and $21_2$ are opened and closed with the characteristics determined by the second cam 32, as shown by the curve $L_{IA}$ in FIG. 4.

The exhaust-side valve operating mechanism 30 comprises a pair of rocker arms 51 independently operatively connected to the exhaust valves $22_1$ and $22_2$ and pivotally carried on a rocker shaft 50, and a pair of cams 52 provided on a cam shaft 53, with the rocker arms 51 being in sliding contact with the cams 52, respectively. The exhaust valves $22_1$ and $22_2$ are opened and closed with the normally same characteristic, as shown by a curve $L_O$ in FIG. 4.

The operation of the control valve 46 administering the switching-over of the fluid pressure to the fluid pressure chamber 43 in the switch-over means $37_1$ is controlled by a control means 55 in accordance with the load on the engine. In a low-load operating range of the engine, the control valve 46 is operated to reduce the fluid pressure in the fluid pressure chamber 43, and in a high-load operating range of the engine, the control valve 46 is operated to increase the fluid pressure in the fluid pressure chamber 43.

Therefore, in the low-load operating range of the engine, the second intake valve $21_2$ is opened and closed in a smaller lift amount and for a smaller opening angle or time period than those of the first intake valve $21_1$, and the fuel is injected in an amount corresponding to a lean burning through the fuel injection valve 20. In order to ensure that a swirl flow required for the lean burning is produced within the combustion chamber 9 during this time, the first intake port $12_1$ is formed into a shape suitable to produce a swirl, as shown by the arrow in FIG. 5. For example, the first intake port $12_1$ is formed into a rectilinear shape such that the center line $C_1$ thereof passes through a center of the first intake valve bore $10_1$, as viewed in a plane.

Thus, a swirl flow required for the lean burning can be reliably produced in the low-load operating range of the engine. In such case, a difference is produced between amounts of fresh air flowing into the intake ports $12_1$ and 13, on the one hand, and if the first and second intake ports $12_1$ and 13 are isolated from each other in order to ensure that the fuel is injected substantially equally from the fuel injection valve 20 into the intake ports $12_1$ and 13, an imbalance is produced in the concentration of the air-fuel mixture flowing from the intake valve bores $10_1$ and $10_2$ into the combustion chamber 9, on the other hand. More specifically, the concentration of the fuel in the air-fuel mixture flowing into the combustion chamber 9 through the second intake valve port $10_2$ with a smaller lift amount and a smaller opening angle is higher, and this air-fuel mixture of the higher concentration flows into the combustion chamber 9 in the middle of the intake stroke and hence, the concentration of the fuel in the vicinity of the spark plug P is higher. As a result, with a construction and operation as thus far described, the ignitability at the lean burning is improved, but the exhaust gas is of a deteriorated nature and in particular, NOx is liable to be produced.

Figure 6:
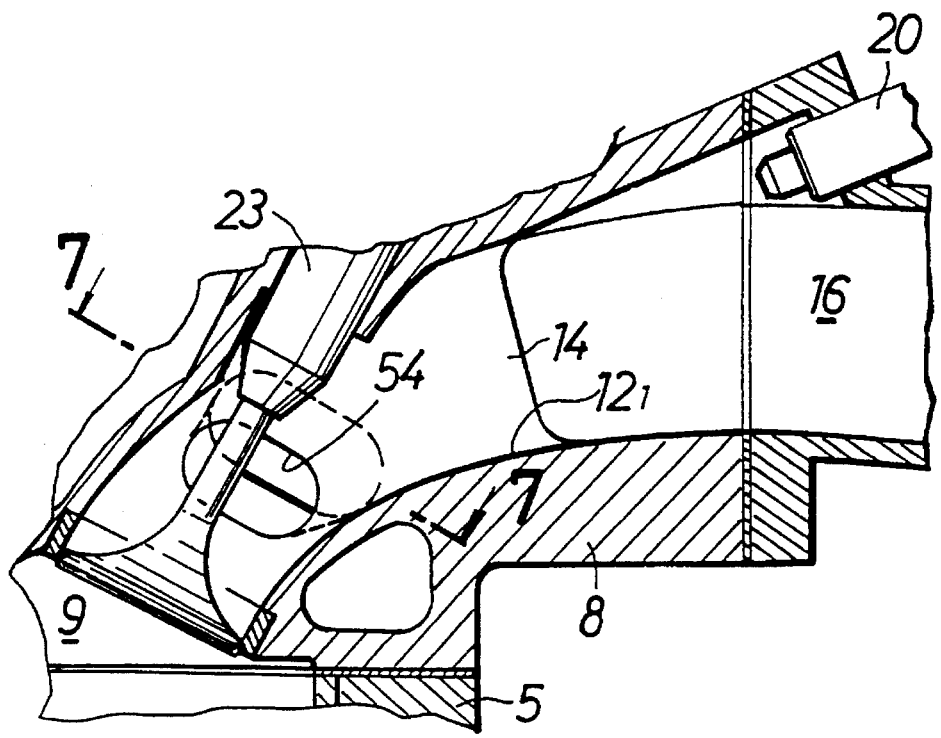
Figure 7:
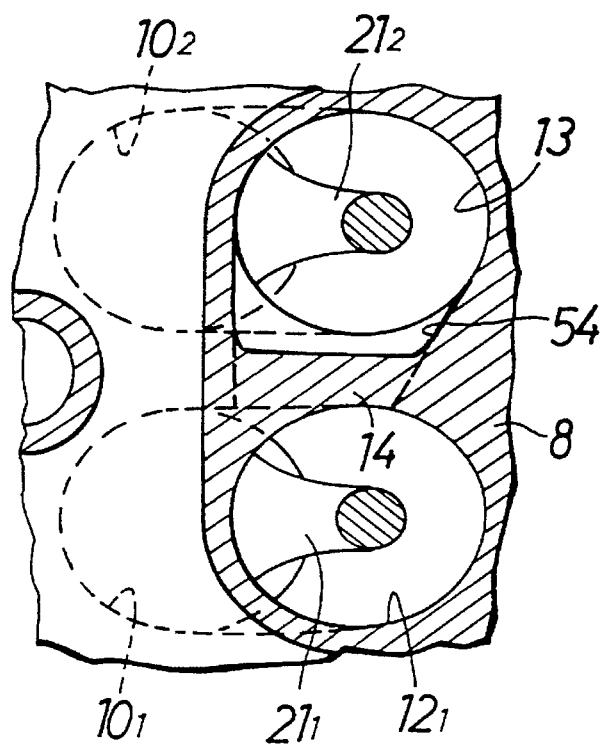

For improving the operation, the partition wall 14 between the first and second intake ports $12_1$ and 13 is provided with a communication hole 54 for communicating the intake ports $12_1$ and 13 with each other. The communication hole 54 is formed so that it is inclined to become gradually closer to the combustion chamber 9, as it extends from the intake port 13 toward the first intake port $12_1$, as shown in FIGS. 6 and 7, and so that the cross-sectional area of communication hole 54 as it opens into the second intake port 13, where the concentration of the air-fuel mixture is higher in the low-load operating range of the engine, is larger than the cross-sectional area of communication hole 54 as it opens into the first intake port $12_1$, where the concentration of the air-fuel mixture is lower. The bottom surface of the communication hole 54 is connected smoothly to the bottom surface of the second intake port 13 without a difference in level therebetween.

The operation of this embodiment now will be described. In the low-load operating range of the engine, the fluid pressure in the fluid pressure chamber 43 in the switch-over means $37_1$ is reduced by the control valve 46, and the intake-side valve operating mechanism $29_1$ allows the first intake valve $21_1$ to be opened and closed by the first cam 32, and also allows the second intake valve $21_2$ by the second cam 33. The lift amount and the opening angle of the second intake valve $21_2$ are smaller than those of the first intake valve $21_1$. During this time, a swirl flow is produced within the combustion chamber 9 to enable a lean burning, because the first intake port $12_1$ is formed into the shape suitable to produce the swirl. Moreover, since the communication hole 54 is provided in the partition wall 14, a portion of the fuel in the second intake port 13 flows through the communication hole 54 into the first intake port $12_1$. Therefore, even though the amount of air-fuel mixture flowing through the second intake valve bore $10_2$ into the combustion chamber 9 is reduced, it is possible to avoid causing the concentration of the fuel in the air-fuel mixture from the second intake valve bore $10_2$ to be excessively high, and to inhibit the concentration of the fuel in the vicinity of the spark plug P from being increased to an excessively high level to produce NOx, while maintaining the ignitability during the lean burning.

In addition, since the communication hole 54 is formed so that it is inclined to become gradually closer to the combustion chamber 9, as it extends from the second intake port 13 toward the first intake port 12, the air-fuel mixture flowing from the communication hole 54 toward the first intake port $12_1$ promotes the generation of the swirl flow of the air-fuel mixture flowing through the first intake valve port $10_1$ into the combustion chamber 9, so that the formation of the air-fuel mixture in the entire combustion chamber 9 can be improved to provide an improved combustibility.

Further, the area of the communication hole 54 opening into the first intake port $12_1$ being smaller than the area opening into the second intake port 13 ensures that the flow of the air-fuel mixture flowing within the communication hole 54 is increased in speed in the direction toward the first intake port $12_1$. This also promotes the generation of the swirl flow to provide a further improved lean combustibility, which contributes to a reduction in specific fuel consumption. Additionally, because the area of the communication hole 54 opening into the first intake port $12_1$ is relatively small, it is possible to increase the degree of freedom of the arrangement in consideration of the direction or the like of the communication hole 54 toward the first intake valve bore $10_1$.

Still further, the smooth connection of the bottom surface of the communication hole 54 to the bottom surface of the second intake port 13, without any difference in level therebetween, ensures that the fuel deposited on the inner surface of the second intake port 13 can be reliably forced to flow toward the first intake port $12_1$ without remaining on the bottom of the second intake port 13. This makes it possible to further promote the equalization of the air-fuel mixture between the intake ports $12_1$ and 13.

In the high-load operating range of the engine, a high fluid pressure is applied to the fluid pressure chamber 43 in the switch-over means $37_1$ by means of the control valve 46, so that the rocker arms 35 and 36 of the intake-side valve operating mechanism $29_1$ are connected integrally. This causes the intake valves $21_1$ and $21_2$ to be opened and closed with the characteristic determined by the first cam 32, thereby permitting an air-fuel mixture of the substantially same amount to flow through the intake valve bores $10_1$ and $10_2$ into the combustion chamber 9. Therefore, an increase in power output can be achieved by a combustion of an air-fuel mixture concentration corresponding to the high-load operating range of the engine.

Figure 8:
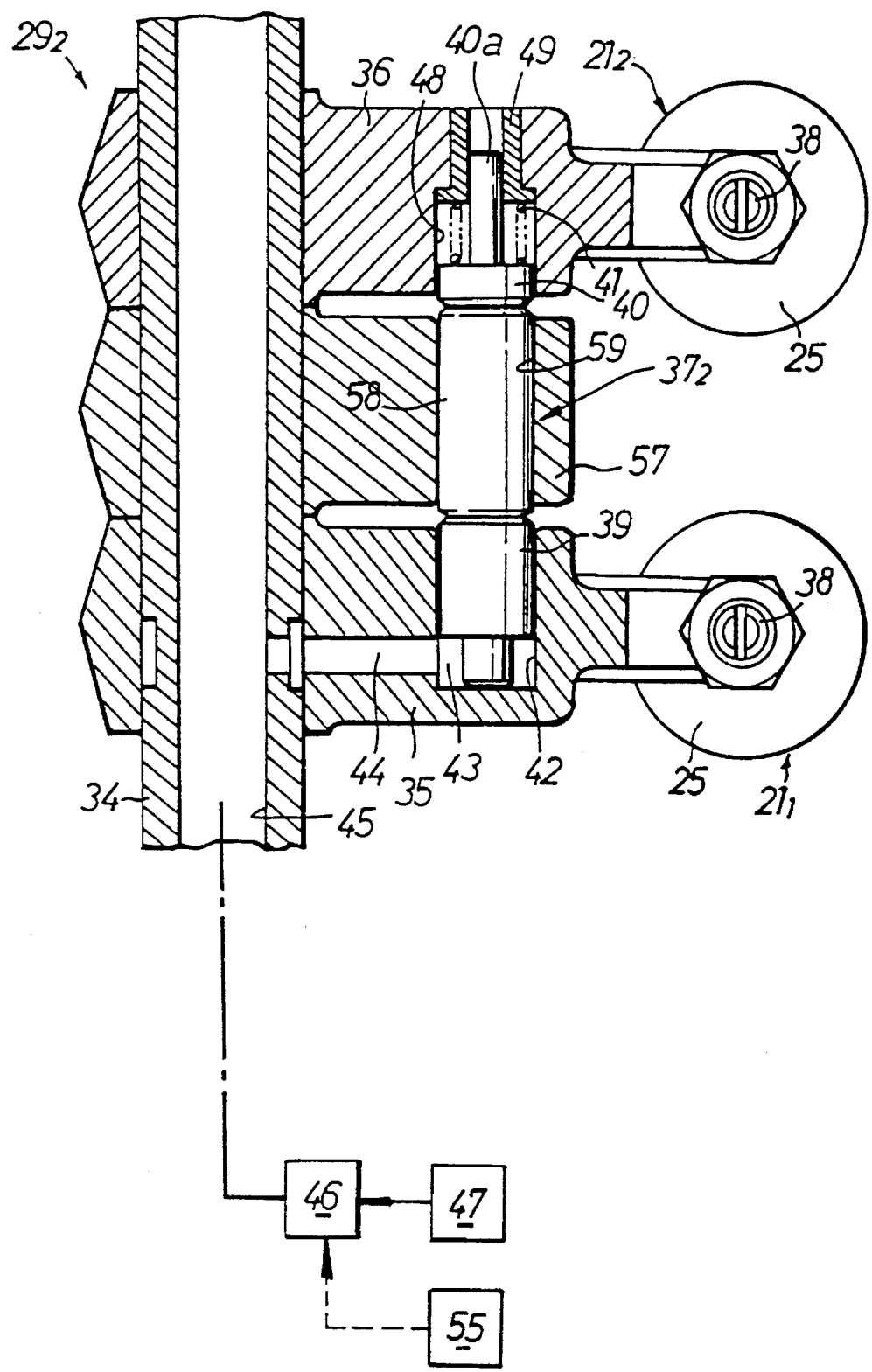
Figure 9:
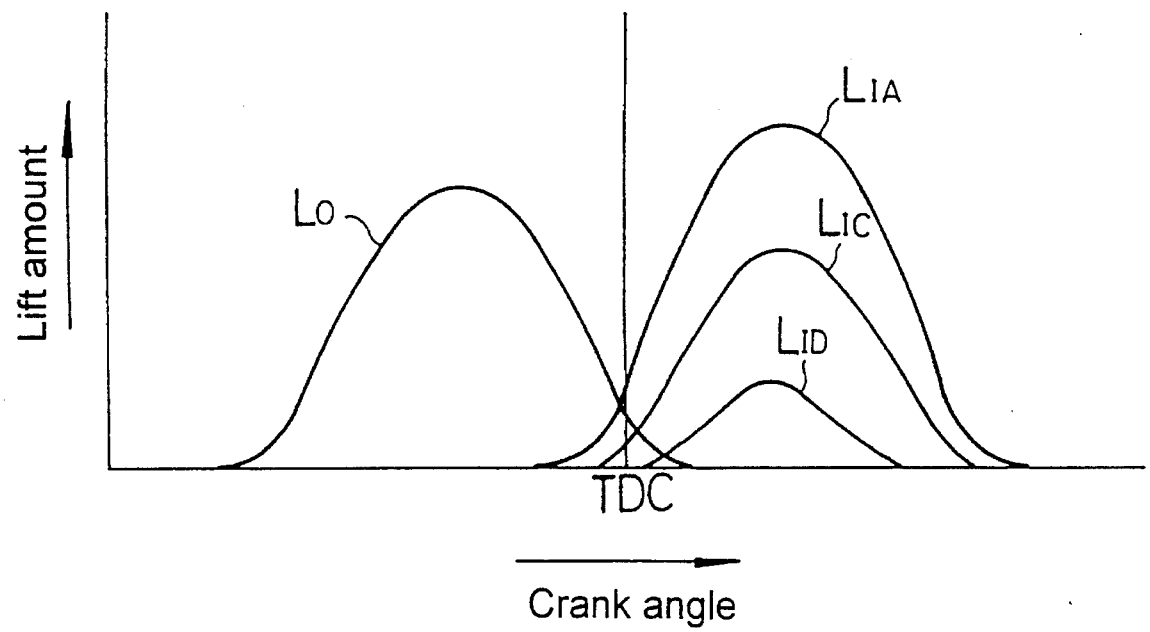

FIGS. 8 and 9 illustrate a second embodiment of the present invention, wherein parts or components corresponding to those in the first embodiment are designated by the same reference characters as those in the first embodiment and will not be described in detail again.

An intake-side valve operating mechanism $29_2$ connected to intake valves $21_1$ and $21_2$ includes a first rocker arm 35 operatively connected to the first intake valve $21_1$ and pivotally carried on a rocker shaft 34, a second rocker arm 36 operatively connected to the second intake valve $21_2$ and pivotally carried on the rocker shaft 34, a third rocker arm 57 pivotally carried on the rocker shaft 34 between the first and second rocker arms 35 and 36, and a switch-over means $37_2$ provided on the rocker arms 35, 36 and 57.

The switch-over means $37_2$ comprises a switch-over piston 39 capable of interconnecting the first and third rocker arms 35 and 57, a switch-over pin 58 capable of interconnecting the third and second rocker arms 57 and 36, a limiting member 40 abutting against the switch-over pin 58, and a return spring 41 for biasing the limiting member 40 toward the switch-over piston 39.

The switch-over piston 39 is slidably received in a guide hole 42 in the first rocker arm 35. The third rocker arm 57 is provided with a guide hole 59 opening into opposite sides thereof and corresponding to the guide hole 42. The switch-over pin 58, with one end abutting against the switch-over piston 39, is slidably fitted into the guide hole 59. The limiting member 40 abuts against the other end of the switch-over pin 58 and is slidably fitted into the guide hole 48 in the second rocker arm 36, and the return spring 41 is mounted under compression between the guide member 49 and the limiting member 40.

In such switch-over means $37_2$, an increase in fluid pressure in the fluid pressure chamber 43 causes the switch-over piston 39 to be fitted into the guide hole 59, while causing the switch-over pin 58 to be fitted into the guide hole 48, thereby connecting all the rocker arms 35, 57 and 36. When the fluid pressure in the fluid pressure chamber 43 is reduced, the switch-over piston 39 is returned under a spring force of the return spring 41 to a position in which the abutment surface against the switch-over pin 58 corresponds to the space between the first and third rocker arms 35 and 57, and the switch-over pin 58 is also returned to a position in which the abutment surface against the limiting member 40 corresponds to the space between the third and second rocker arms 57 and 36, thereby disconnecting the rocker arms 35, 57 and 36.

When the switch-over means $37_2$ is brought into the disconnecting state, the first intake valve $21_1$ is opened and closed, as shown by a curve $L_{IC}$ in FIG. 9, as the first rocker arm 35 is swingably driven by a cam (not shown), and the second intake valve $21_2$ is opened and closed, as shown by a curve $L_{ID}$ in FIG. 9, as the second rocker arm 36 is swingably driven by a cam (not shown). More specifically, the second intake valve $21_2$ is opened in a smaller lift amount and for a smaller opening angle than those of the first intake valve $21_1$. On the other hand, when the switch-over means $37_2$ is brought into the connecting state, both the intake valves $21_1$ and $21_2$ are opened and closed, as shown by a curve $L_{IA}$ in FIG. 9, as the third rocker arm 57 is swingably driven by a high speed third cam (not shown) above third rocker arm 57.

Even with the second embodiment, an effect similar to that in the first embodiment can be provided by permitting the air-fuel mixture to flow from the second intake port 13 through the communication hole 54 (see FIGS. 1, 2, 5, 6 and 7), as in the first embodiment, into the first intake port $12_1$ in an operating range in which the switch-over means $37_2$ is brought into the disconnecting state to cause the second intake valve $21_2$ to be opened and closed in a smaller lift amount and for a smaller opening angle than those of the first intake valve $21_1$.

Figure 10:
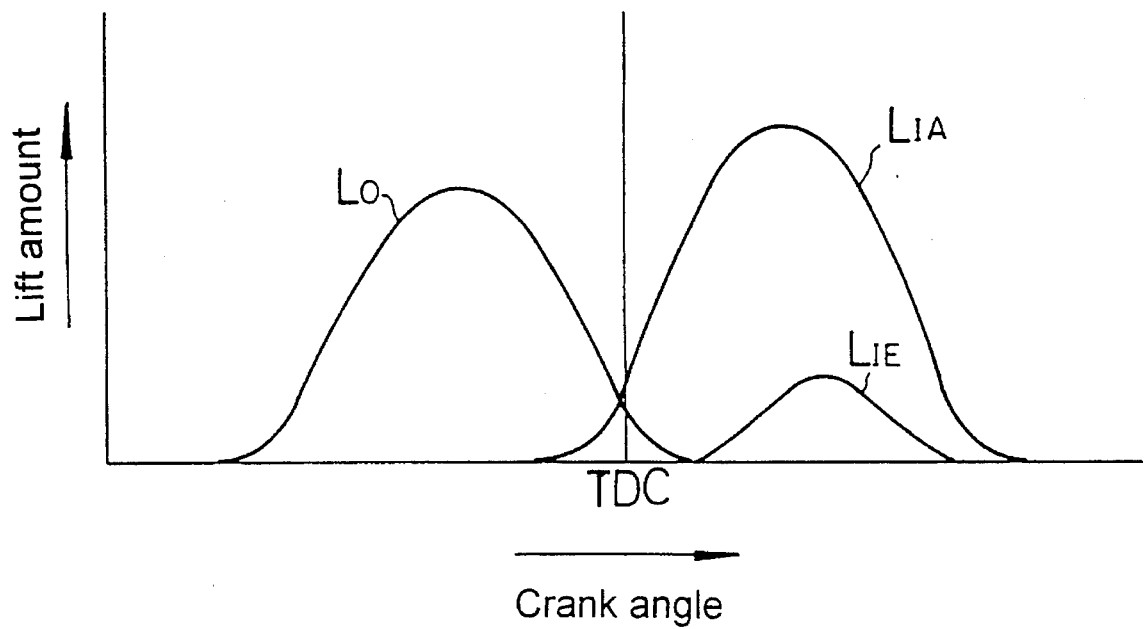
FIG. 10 is a diagram illustrating a lift characteristic for intake and exhaust valves in an internal combustion engine to which a third embodiment of the present invention is applied.

In a third embodiment of the present invention, an intake-side valve operating mechanism similar to that of the first embodiment, but with different cam profiles, may be used which is adapted to open and close the first intake valve $21_1$ with a characteristic shown by a curve $L_{IA}$ and to open and close the second intake valve $21_2$ with a characteristic shown by a curve $L_{IE}$, as shown in FIG. 10.

Figure 11:
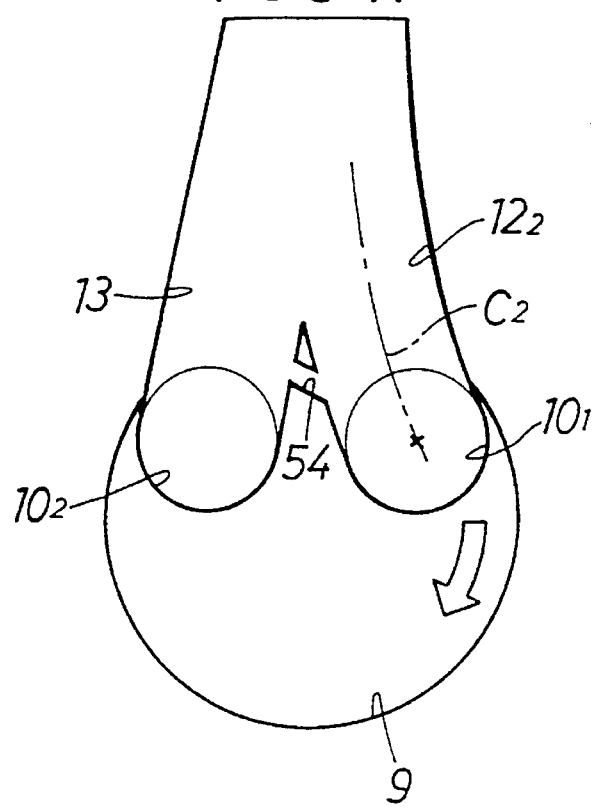
FIG. 11 is a plan view similar to FIG. 5, but illustrating an internal combustion engine to which a fourth embodiment of the present invention is applied.
Figure 12:
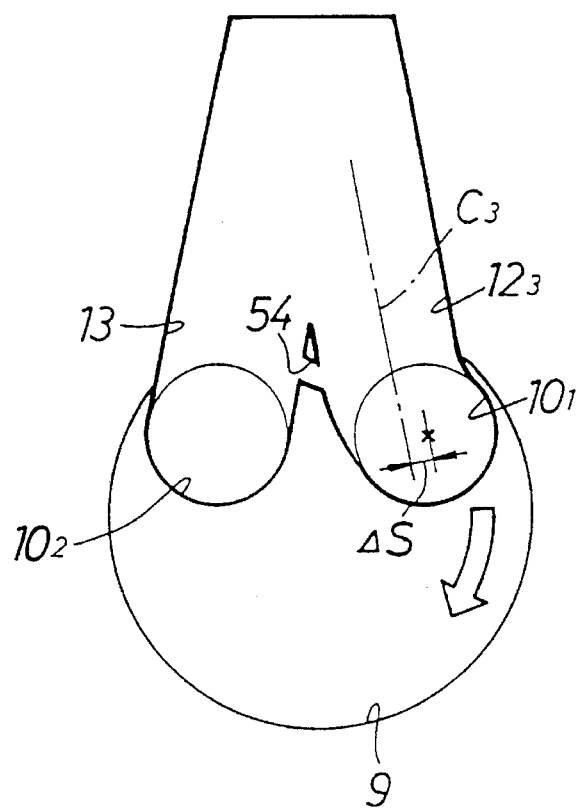
FIG. 12 is a plan view similar to FIG. 5, but illustrating an internal combustion engine to which a fifth embodiment of the present invention is applied.
Figure 13:
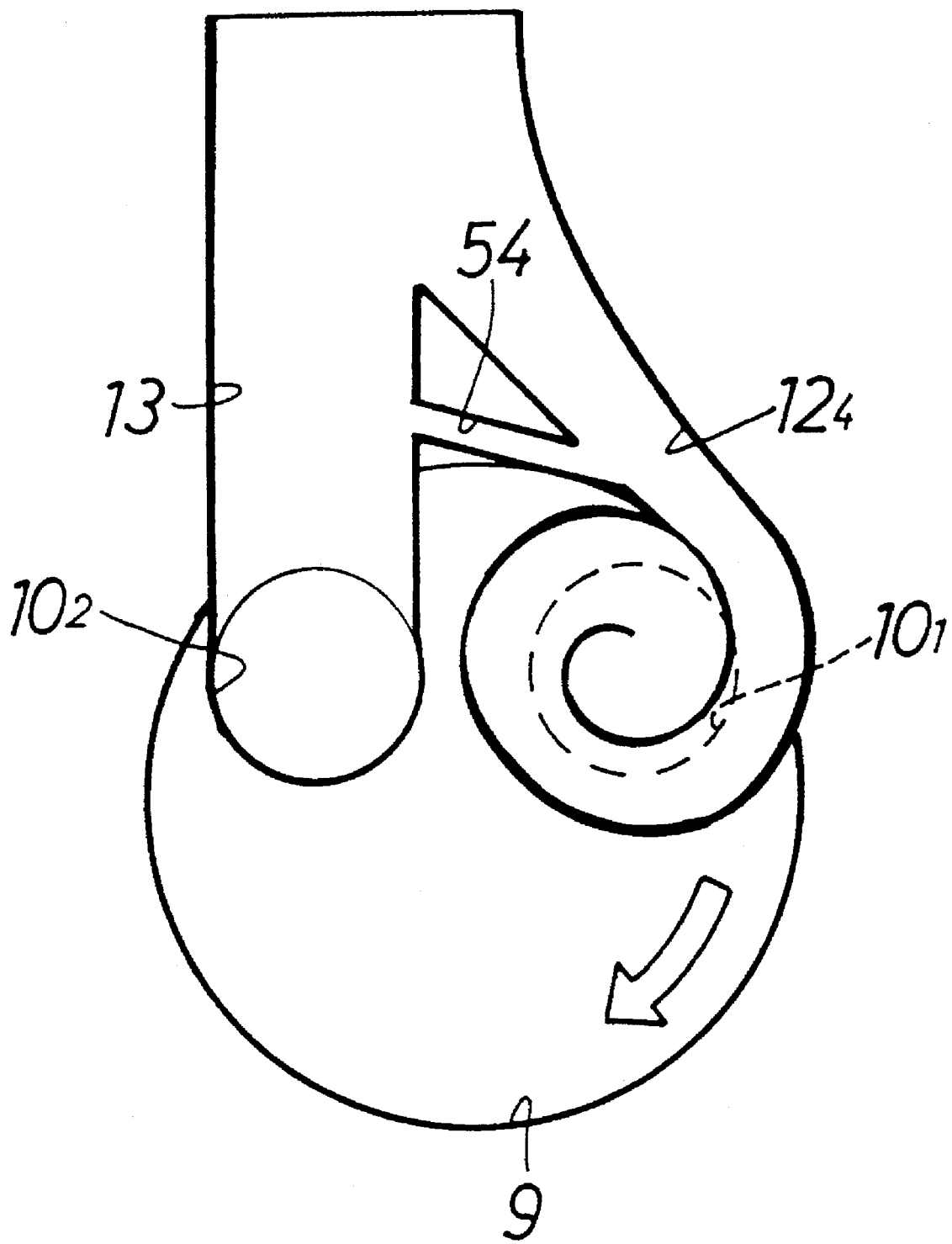
FIG. 13 is a plan view similar to FIG. 5, but illustrating an internal combustion engine to which a sixth embodiment of the present invention is applied.

In a fourth embodiment of the present invention, the first intake port $12_2$ may be formed to produce a swirl, so that the center line $C_2$ is curved to extend through the center of the first intake valve bore $10_1$, as shown in FIG. 11. In a fifth embodiment of the present invention, the first intake port $12_3$ may be formed to produce a swirl, so that the center line $C_3$ extends through a location offset by an offset amount $\Delta S$ inwardly from the center of the first intake valve bore $10_1$, as shown in FIG. 12. In a sixth embodiment of the present invention, the first intake port $12_4$ may be formed into a spiral shape to produce a swirl.

Although the embodiments of the present invention have been described in detail, it will be understood that the present invention is not limited to these embodiments, and various modifications in design can be made without departing from the spirit and scope of the invention defined in the claims.

For example, both the intake valves $21_1$ and $21_2$ can be opened and closed irrespective of the load of the engine, but the present invention is applicable to an intake system in which the amount of fresh air flowing into the second intake port 13 is throttled by a means other than the intake valve in a low loading of the engine.

What is claimed is:

1. An intake system for an internal combustion engine, comprising first and second intake valve bores provided to face a combustion chamber and to be independently opened and closed by first and second intake valves, and first and second intake ports which are respectively connected to the first and second intake valve bores with a partition wall interposed therebetween and which communicate with a common intake passage, in which, in a particular operation range of the engine, an imbalance is produced in a concentration of an air-fuel mixture flowing through said first and second intake valve bores into the combustion chamber on the basis of a difference between the amounts of fresh air flowing into the first and second intake ports, wherein said system further includes a communication hole provided in the partition wall for putting the first and second intake ports into communication with each other, and where said communication hole is formed such that an area opening into the intake port where the concentration of the air-fuel mixture is higher in the particular operating range of the engine is larger than an area opening into the intake port where the concentration of the air-fuel mixture is lower.

2. An intake system for an internal combustion engine according to claim 1, wherein said communication hole has a bottom surface which is smoothly connected to a bottom surface of the intake port where the concentration of the air-fuel mixture is higher in the particular operating range of the engine.

3. An intake system for an internal combustion engine according to claim 1, wherein said communication hole is inclined toward the combustion chamber in a direction toward the intake port where the concentration of the air-fuel mixture is lower in the particular operating range of the engine from the intake port where the concentration of the air-fuel mixture is higher.

4. An intake system for an internal combustion engine according to claim 2, wherein said communication hole is inclined toward the combustion chamber in a direction toward the intake port where the concentration of the air-fuel mixture is lower in the particular operating range of the engine from the intake port where the concentration of the air-fuel mixture is higher.

5. An intake system for an internal combustion engine according to claim 2, wherein said intake port where the concentration of the air-fuel mixture is lower in the particular operating range of the engine is formed into a shape suitable for producing a swirl within said combustion chamber in the particular operating range of the engine.

6. An intake system for an internal combustion engine according to claim 1, further including a switch-over means capable of switching-over between two states, namely, 1) a state in which the amounts of fresh air flowing into the first and second intake ports are not equalized in a low-load operating range of the engine, and 2) a state in which the amounts of fresh air flowing into the first and second intake ports are equalized in a high-load operating range of the engine.

7. An intake system for an internal combustion engine according to claim 1, further including a switch-over means capable of switching-over between two states, namely, 1) a state in which the amounts of fresh air flowing into the first and second intake ports are not equalized in a low-load operating range of the engine, and 2) a state in which the amounts of fresh air flowing into the first and second intake ports are equalized in a high-load operating range of the engine.

8. An intake system for an internal combustion engine according to claim 3, wherein said communication hole has a bottom surface which is smoothly connected to a bottom surface of the intake port where the concentration of the air-fuel mixture is higher in the particular operating range of the engine.

9. An intake system for an internal combustion engine according to claim 8, wherein said intake port where the concentration of the air-fuel mixture is lower in the particular operating range of the engine is formed into a shape suitable for producing a swirl within said combustion chamber in the particular operating range of the engine.

10. An intake system for an internal combustion engine according to claim 9, further including a switch-over means capable of switching-over between two states, namely, 1) a state in which the amounts of fresh air flowing into the first and second intake ports are not equalized in a low-load operating range of the engine, and 2) a state in which the amounts of fresh air flowing into the first and second intake ports are equalized in a high-load operating range of the engine.

11. An intake system for an internal combustion engine, comprising first and second intake valve bores provided to face a combustion chamber and to be independently opened and closed by first and second intake valves, and first and second intake ports which are respectively connected to the first and second intake valve bores with a partition wall interposed therebetween and which communicate with a common intake passage, in which, in a particular operation range of the engine, an imbalance is produced in a concentration of an air-fuel mixture flowing through said first and second intake valve bores into the combustion chamber on the basis of a difference between the amounts of fresh air flowing into the first and second intake ports, wherein said system further includes a communication hole provided in the partition wall for putting the first and second intake ports into communication with each other, and wherein said intake port where the concentration of the air-fuel mixture is lower in the particular operating range of the engine is formed into a shape suitable for producing a swirl within said combustion chamber in the particular operating range of the engine.

12. An intake system for an internal combustion engine according to claim 11, further including a switch-over means capable of switching-over between two states, namely, 1) a state in which the amounts of fresh air flowing into the first and second intake ports are not equalized in a low-load operating range of the engine, and 2) a state in which the amounts of fresh air flowing into the first and second intake ports are equalized in a high-load operating range of the engine.

13. An intake system for an internal combustion engine according to claim 11, wherein said communication hole is formed such that an area opening into the intake port where the concentration of the air-fuel mixture is higher in the particular operating range of the engine is larger than an area opening into the intake port where the concentration of the air-fuel mixture is lower.

14. An intake system for an internal combustion engine according to claim 13, wherein said communication hole is inclined toward the combustion chamber in a direction toward the intake port where the concentration of the air-fuel mixture is lower in the particular operating range of the engine from the intake port where the concentration of the air-fuel mixture is higher.

15. An intake system for an internal combustion engine, comprising first and second intake valve bores provided to face a combustion chamber and to be independently opened and closed by first and second intake valves, first and second intake ports which are respectively connected to the first and second intake valve bores with a partition wall interposed therebetween and which communicate with a common intake passage, a fuel injection valve disposed in the vicinity of a junction of said first and second intake ports for injecting a fuel substantially equally toward both said intake ports, and a valve operating mechanism connected to said first and second intake valves for opening and closing said second intake valve with an operation characteristic where at least one of a lift amount and an opening angle is maintained smaller than that of said first intake valve, at least in a particular operating range of the engine, said system further including a communication hole provided in the partition wall for putting said first and second intake ports into communication with each other.

16. An intake system for an internal combustion engine according to claim 15, wherein said communication hole is formed such that an area opening into the intake port where the concentration of the air-fuel mixture is higher in the particular operating range of the engine is larger than an area opening into the intake port where the concentration of the air-fuel mixture is lower.

17. An intake system for an internal combustion engine according to claim 15, wherein said communication hole has a bottom surface which is smoothly connected to a bottom surface of the intake port where the concentration of the air-fuel mixture is higher in the particular operating range of the engine.

18. An intake system for an internal combustion engine according to claim 15, wherein said communication hole is inclined toward the combustion chamber in a direction toward the intake port where the concentration of the air-fuel mixture is lower in the particular operating range of the engine from the intake port where the concentration of the air-fuel mixture is higher.

19. An intake system for an internal combustion engine according to claim 15, wherein said intake port where the concentration of the air-fuel mixture is lower in the particular operating range of the engine is formed into a shape suitable for producing a swirl within said combustion chamber in the particular operating range of the engine.

20. An intake system for an internal combustion engine, having first and second intake valve bores in a combustion chamber opened and closed by first and second intake valves with first and second intake ports respectively connected to the first and second intake valve bores and a partition wall interposed between the intake ports which communicate with a common intake passage and a communication hole provided in the partition wall for putting the first and second intake ports into communication with each other for allowing an air-fuel mixture in the second intake port to flow into the first intake port when air-fuel mixture flow in the second intake port is slower than air-fuel mixture flow in the first intake port, wherein said communication hole is formed such that a cross-sectional area opening into the second intake port is larger than a cross-sectional area opening into the first intake port.

21. An intake system for an internal combustion engine according to claim 20, wherein said communication hole has a bottom surface which is smoothly connected to a bottom surface of the second intake port.

22. An intake system for an internal combustion engine according to claim 20, wherein said communication hole is inclined toward the combustion chamber in a direction from the second intake port toward the first intake port.

23. An intake system for an internal combustion engine according to claim 20, wherein said first intake port is formed into a shape for producing a swirl within said combustion chamber.

24. An intake system for an internal combustion engine according to claim 20, further including a switch-over means capable of switching-over between two states, namely, 1) a state in which the amounts of fresh air flowing into the first and second intake ports are not equalized in a low-load operating range of the engine, and 2) a state in which the amounts of fresh air flowing into the first and second intake ports are equalized in a high-load operating range of the engine.

25. An intake system for na internal combustion engine according to claim 24, wherein said communication hole has a bottom surface which is smoothly connected to a bottom surface of the second intake port.

26. An intake system for na internal combustion engine according to claim 24, wherein said communication hole is inclined toward the combustion chamber in a direction from the second intake port toward the first intake port.

27. An intake system for an internal combustion engine according to claim 24, wherein said first intake port is formed into a shape for producing a swirl within said combustion chamber.

28. An intake system for an internal combustion engine, having first and second intake valve bores in a combustion chamber opened and closed by first and second intake valves with first and second intake ports respectively connected to the first and second intake valve bores and a partition wall interposed between the intake ports which communicate with a common intake passage and a communication hole provided in the partition wall for putting the first and second intake ports into communication with each other for allowing an air-fuel mixture in the second intake port to flow into the first intake port when air-fuel mixture flow in the second intake port is slower than air-fuel mixture flow in the first intake port, wherein said communication hole is inclined toward the combustion chamber in a direction from the second intake port toward the first intake port.

29. An intake system for an internal combustion engine according to claim 28, wherein said first intake port is formed into a shape for producing a swirl within said combustion chamber.

30. An intake system for an internal combustion engine according to claim 28, wherein said communication hole has a bottom surface which is smoothly connected to a bottom surface of the intake port.

31. An intake system for an internal combustion engine according to claim 28, wherein said communication hole is formed such that a cross-sectional area opening into the second intake port is larger than a cross-sectional area opening into the first intake port.

\* \* \* \* \*